US009604559B2

(12) United States Patent
Yoo (10) Patent No.: US 9,604,559 B2
(45) Date of Patent: Mar. 28, 2017

(54) 4-WAY LUMBAR SUPPORT

(71) Applicant: HYUNDAE ENTERPRISE CO., LTD, Gyeonggi-do (KR)

(72) Inventor: Hong Chun Yoo, Seoul (KR)

(73) Assignee: HYUNDAE ENTERPRISE CO. LTD, Gyeonggi-Do (KR)

( * ) Notice: Subject to any disclaimer, the term of this patent is extended or adjusted under 35 U.S.C. 154(b) by 0 days.

(21) Appl. No.: 14/854,086

(22) Filed: Sep. 15, 2015

(65) Prior Publication Data

US 2016/0250957 A1    Sep. 1, 2016

(30) Foreign Application Priority Data

Feb. 27, 2015  (KR) .................. 10-2015-0028556

(51) Int. Cl.
B60N 2/66    (2006.01)

(52) U.S. Cl.
CPC ........... *B60N 2/666* (2015.04); *B60N 2/6673* (2015.04)

(58) Field of Classification Search
CPC .............................. B60N 2/6673; B60N 2/666
USPC .......................................... 297/284.4, 284.7
See application file for complete search history.

(56) References Cited

U.S. PATENT DOCUMENTS

| | | | |
|---|---|---|---|
| 4,449,751 A * | 5/1984 | Murphy | B60N 2/66 297/284.4 |
| 5,397,164 A * | 3/1995 | Schuster | A43D 3/1433 297/284.1 |
| 5,507,559 A * | 4/1996 | Lance | B60N 2/6673 297/284.4 |
| 5,984,407 A * | 11/1999 | Ligon, Sr. | B60N 2/66 297/284.4 X |
| 6,227,618 B1 * | 5/2001 | Ligon, Sr. | B60N 2/6671 297/284.4 |
| 8,091,967 B2 * | 1/2012 | Schweizer | B60N 2/0232 297/284.7 |
| 9,254,768 B2 | 2/2016 | Hong | |
| 2007/0102977 A1 * | 5/2007 | Fischer | B60N 2/0232 297/284.4 |
| 2014/0070583 A1 * | 3/2014 | McMillen | B60N 2/66 297/284.4 |

(Continued)

FOREIGN PATENT DOCUMENTS

| | | |
|---|---|---|
| KR | 1998-044566 | 9/1998 |
| KR | 10-1398321 | 5/2014 |
| KR | 10-1444192 | 9/2014 |

OTHER PUBLICATIONS

Search Report from corresponding Korean Application KR 10-2015-0028556 dated Jan. 14, 2016 (4 pages).

*Primary Examiner* — Rodney B White
(74) *Attorney, Agent, or Firm* — Anderson Gorecki LLP (57) ABSTRACT

Disclosed herein is a 4-way lumbar support capable of automatically adjusting a vertical curved position and an amount of curvature of a lumbar plate, while securely supporting the lumbar plate even when a large load, such as the rear-end collision of a vehicle, is applied to the lumbar plate. In addition, the 4-way lumbar support can adjust an amount of forward curvature of the lumbar plate using a pusher including a pair of hinge members, thereby enabling the amount of forward curvature of the lumbar plate to be adjusted across a wider range without increasing the thickness of a seat back in the forward and backward directions thereof.

11 Claims, 9 Drawing Sheets

(56) References Cited

U.S. PATENT DOCUMENTS

2014/0125101 A1* 5/2014 Hong .................. B60N 2/66
297/284.4
2014/0125102 A1* 5/2014 McMillen ............ B60N 2/66
297/284.4

* cited by examiner

4-WAY LUMBAR SUPPORT

CROSS-REFERENCE(S) TO RELATED APPLICATIONS

This application claims priority to Korean Patent Application No. 10-2015-0028556, filed on Feb. 27, 2015, the disclosure of which is incorporated herein by reference in its entirety.

BACKGROUND OF THE INVENTION

Field of the Invention

Exemplary embodiments of the present invention relate to a lumbar support, and more particularly, to a 4-way lumbar support capable of automatically adjusting a vertical position and an amount of forward protrusion of a curved part of a lumbar plate, which is provided in a vehicle seat back, using respective motors.

Description of the Related Art

In general, a driver seat, an occupant seat, and seats as other occupant seats, which are installed in front of and behind a vehicle interior, have various comfort devices for convenience of occupants.

The comfort devices have a sliding function of adjusting a seat cushion by the forward and backward pushing/pulling of the seat cushion, a reclining function of adjusting the inclination of a seat back corresponding to the back of the seat, according to the body types of occupants, and a seat height adjustment function of adjusting the height of the seat cushion so as to be suitable for the body sizes of occupants.

In addition, in order to basically cope with a change in seating posture of an occupant during long-time driving, a cushion for comfortably surrounding the back of the occupant and a lumbar support for comfortably supporting the lumbar have been adopted within the seat back.

In particular, there is applied a 4-way lumbar support capable of adjusting an amount of forward curvature of a lumbar plate, which is provided in the seat back to extend vertically along the back of the occupant and has elasticity, and the vertical curved position of the lumbar plate, so as to be suitable for the body type of the occupant using the lumbar plate.

In connection with the conventional lumbar support which is adjustable in four directions, Korean Patent Laid-open Publication No. 10-2007-0039774 discloses a structure that adjusts an amount of curvature and a curved position of a lumbar plate using a plurality of wires.

This method of using the wires may cause inconvenience for an occupant because the occupant has to basically adjust the amount of curvature and the curved position of the lumbar plate by operating a lever or dial connected to end portions of the wires.

In addition, the wires are stretched by a certain amount with the elapse of long time in the state in which a predetermined tensile force is applied to the wires. For this reason, it is difficult to secure an amount of curvature of the lumbar plate over a certain level in the state in which the wires are stretched.

Moreover, when a large load, such as the weight of an occupant generated by the rear-end collision of the vehicle, is applied to the lumbar plate in the method of using the wires, a connection portion between the lumbar plate and the wires may be damaged or even be destroyed due to the load applied to the lumbar plate from the occupant.

As an alternative to this, Korean Patent Laid-open Publication No. 1999-021067 discloses a structure that mechanically adjusts an amount of forward curvature of a lumbar plate using a rotating rod, which extends in a direction perpendicular to the lumbar plate and has a screw formed on one end thereof. However, such a structure is problematic in that the rotating rod has a limited length due to the thickness of the seat back in the forward and backward direction thereof, and thus the amount of forward curvature of the lumbar plate is limited to a certain level.

[Patent Document 0001] Korean Patent Laid-open Publication No. 10-2007-0039774

[Patent Document 0002] Korean Patent Laid-open Publication No. 1999-021067

SUMMARY OF THE INVENTION

An object of the present invention is to provide a 4-way lumbar support capable of automatically adjusting a vertical curved position and an amount of curvature of a lumbar plate using a plurality of driving parts including motors, while securely supporting the lumbar plate even when a large load, such as the rear-end collision of a vehicle, is applied to the lumbar plate.

Another object of the present invention is to provide a 4-way lumbar support capable of adjusting an amount of forward curvature of a lumbar plate using a pusher including a pair of hinge members, thereby enabling the amount of forward curvature of the lumbar plate to be adjusted across a wider range compared to the related art, without increasing the thickness of a seat back in the forward and backward directions thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a 4-way lumbar support includes a lumbar plate supported by a seat back frame of a vehicle seat and at least partially forming a curved part to support the back of an occupant, a guide rod fixed to the seat back frame and extending vertically, a sliding base provided to be vertically movable along the guide rod, a pusher provided to be vertically movable together with the sliding base and protruding forward toward the lumbar plate to press the lumbar plate, a first driving part vertically moving the sliding base by electric power supplied from the outside to adjust a vertical position of the pusher, and a second driving part adjusting an amount of forward protrusion of the pusher by electric power supplied from the outside, wherein the pusher includes a first hinge member, a lower end portion of which is pivotably connected to the sliding base, and a second hinge member, a lower end portion of which is pivotably connected to an upper end portion of the first hinge member through a hinge shaft while an upper end portion of the second hinge member is slidably supported by the guide rod, and a distance between the lower end portion of the first hinge member and the upper end portion of the second hinge member is adjusted by action of the second driving part.

The first driving part may include a first motor fixed to the seat back frame, and a first lead screw extending vertically and rotatably driven by the first motor, and the sliding base may have a through-hole through which the first lead screw passes.

The through-hole of the sliding base may have a thread formed on an inside surface thereof to be engaged with the first lead screw.

The first driving part may further include a first deceleration part provided between the first motor and the first lead screw.

The second driving part may include a second motor provided to be vertically movable along the guide rod, a second lead screw extending in parallel with the hinge shaft and rotatably driven by the second motor, at least one nut having a thread formed on an inner peripheral surface thereof to be engaged with the second lead screw, and moving along an outer peripheral surface of the second lead screw along with rotation of the second lead screw, and a plurality of link members connecting the nut to each of the first and second hinge members.

The nut may include a first nut and a second nut, which move in opposite directions along with the rotation of the second lead screw.

A thread provided on an inner peripheral surface of the first nut and a thread provided on an inner peripheral surface of the second nut may be formed in opposite directions.

The outer peripheral surface of the second lead screw may be divided into a first section screwed with the first nut, and a second section screwed with the second nut, and threads formed in the first and second sections may be formed in opposite directions.

The first and second sections may have the same width.

The link members may include a first link member connected to an upper end of the first nut and the upper end portion of the second hinge member, a second link member connected to a lower end of the first nut and the lower end portion of the first hinge member, a third link member connected to an upper end of the second nut and the upper end portion of the second hinge member, and a fourth link member connected to a lower end of the second nut and the lower end portion of the first hinge member.

The second driving part may further include a second deceleration part provided between the second motor and the first lead screw.

The second driving part may further include a sliding bracket which is slidably supported by the guide rod while the second motor is fixed to the sliding bracket.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

A 4-way lumbar support according to exemplary embodiments of the present invention will be described below in detail with reference to the accompanying drawings.

Since various modifications may be performed on the exemplary embodiments of the present invention and the embodiments of the present invention can be implemented in a wide range of varied forms, specific exemplary embodiments of the present invention will be described herein in detail with reference to the accompanying drawings of the exemplary embodiments of the present invention. However, the present invention will not be limited only to the specific exemplary embodiments of the present invention which are disclosed herein. Therefore, it should be understood that the scope and spirit of the present invention can be extended to all variations, equivalents, and replacements in addition to the accompanying drawings of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

As used here, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms are intended to include the plural forms as well, unless the context clearly indicates otherwise.

It will be further understood that the terms "comprises/comprising" or "includes/including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

In addition, the following embodiments are provided so that this disclosure will be thorough and complete, and will fully convey the scope of the present invention to those skilled in the art. In the drawings, the shape, size, or the like of each component may be exaggerated for convenience of description and clarity.

Figure 1:
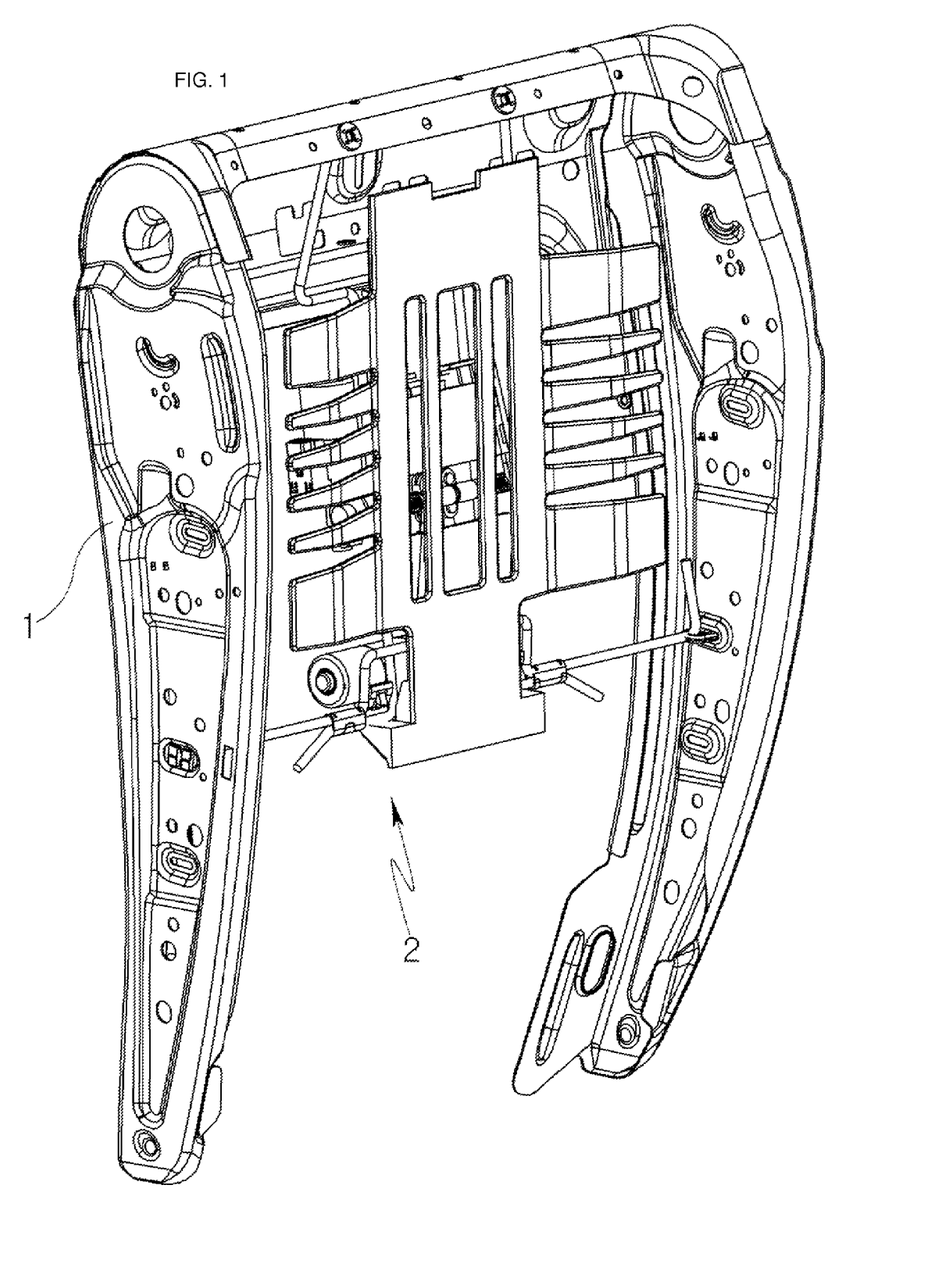
FIGS. 1 and 2 are perspective views illustrating a seat back frame to which a 4-way lumbar support according to an embodiment of the present invention is installed.
Figure 2:
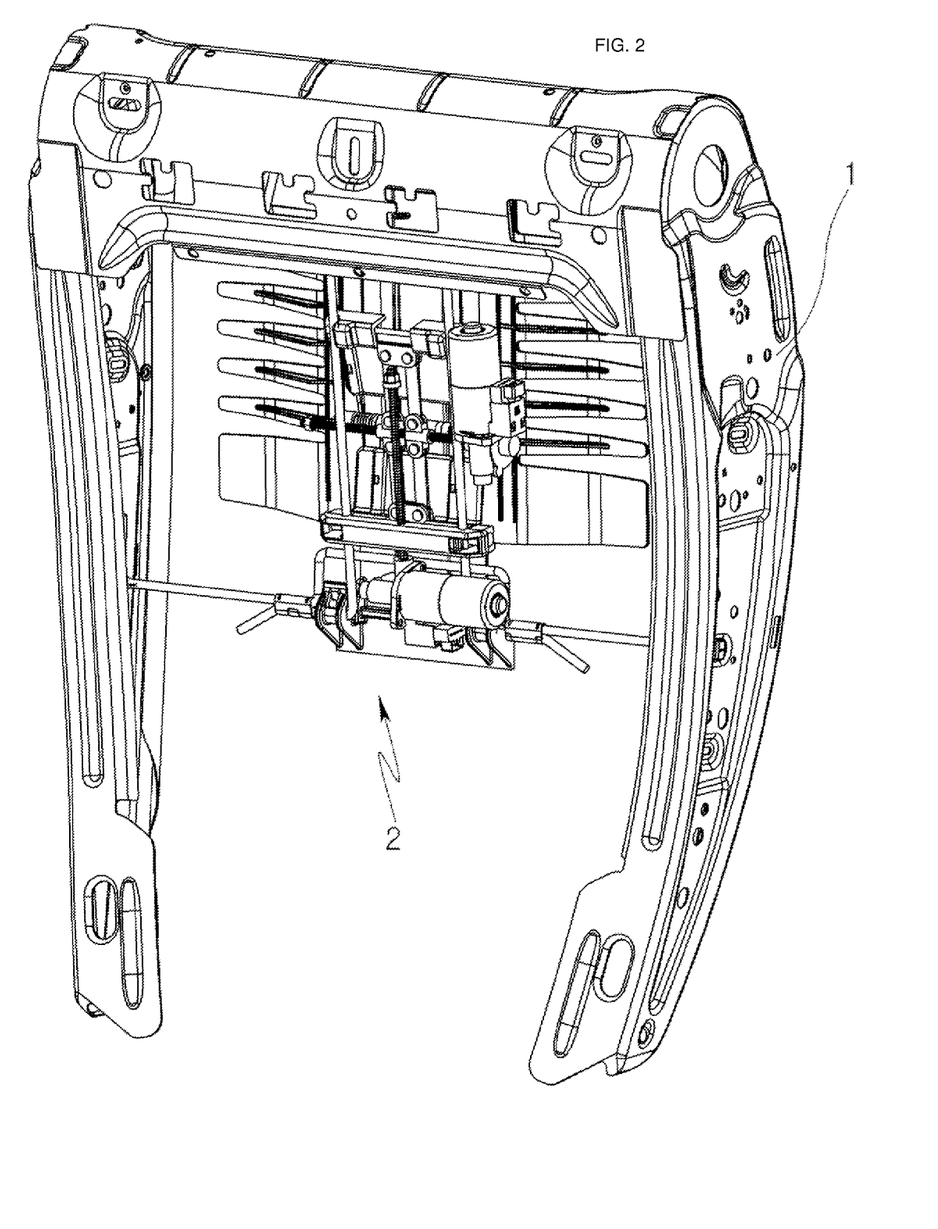

FIGS. 1 and 2 are perspective views illustrating a seat back frame 1 to which a 4-way lumbar support 2 according to an embodiment of the present invention is installed.

As illustrated in FIGS. 1 and 2, the 4-way lumbar support 2 according to the embodiment of the present invention is provided in a seat back, in particular, in the internal space of the seat back frame 1, and is securely fixed to the seat back frame 1 so as to adjustably support the back and lumbar of an occupant according to the body type of the occupant.

Although not illustrated, the seat back is configured such that cushion pads and other skin materials for increasing the riding quality of the occupant are provided outside the 4-way lumbar support 2.

Meanwhile, although the seat back frame 1 having a substantially " ⊏ " shape is illustrated in FIGS. 1 and 2, the present invention is not limited thereto. The seat back frame 1 may be applied to the present invention without limitation, as long as it has a structure that may securely support the 4-way lumbar support 2 of the present invention.

As described above, the 4-way lumbar support 2 of the present invention is configured to automatically adjust a vertical curved position of a lumbar plate and an amount of forward curvature of a curved part in a motor-driven manner, so as to support the back and lumbar of the occupant according to the body type of the occupant.

Figure 3:
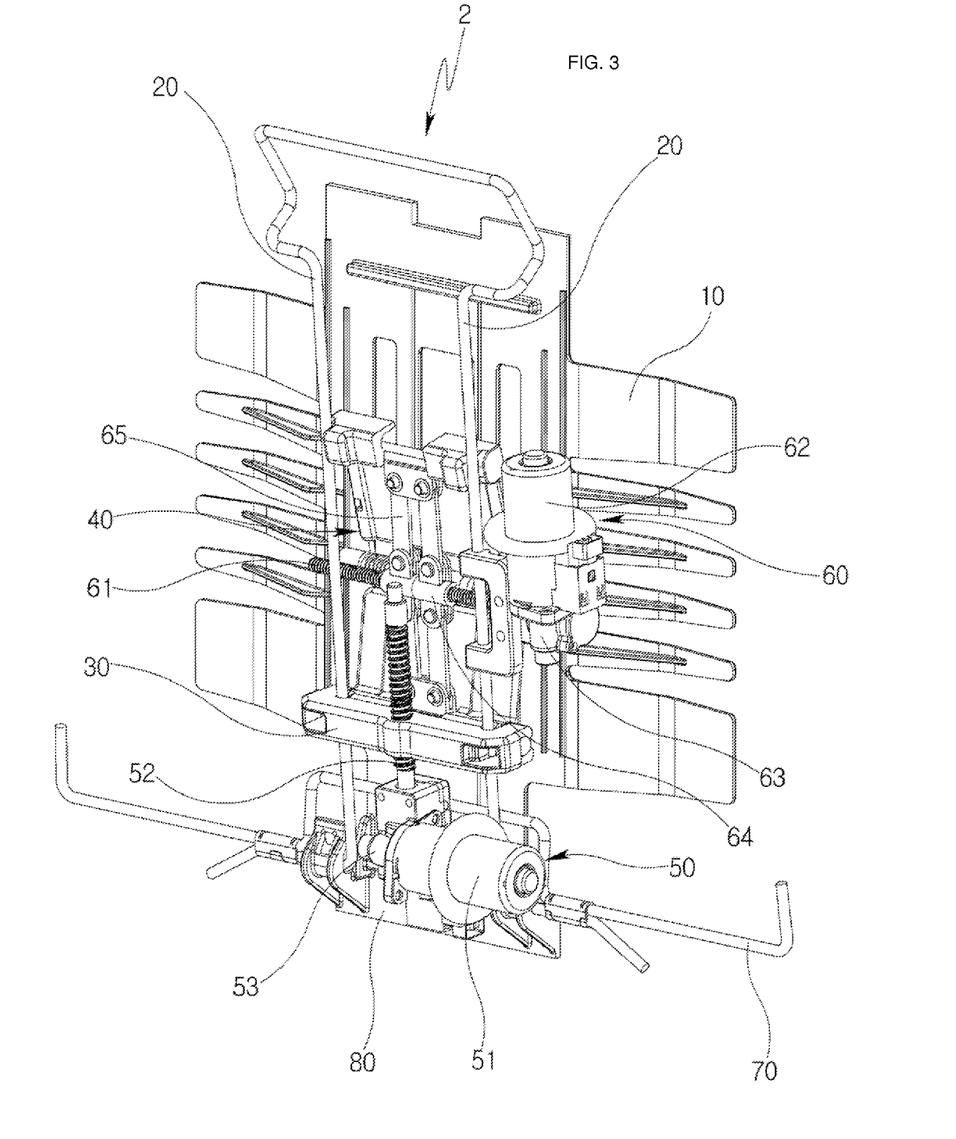
FIG. 3 is a perspective view illustrating the 4-way lumbar support according to the embodiment of the present invention.
Figure 4:
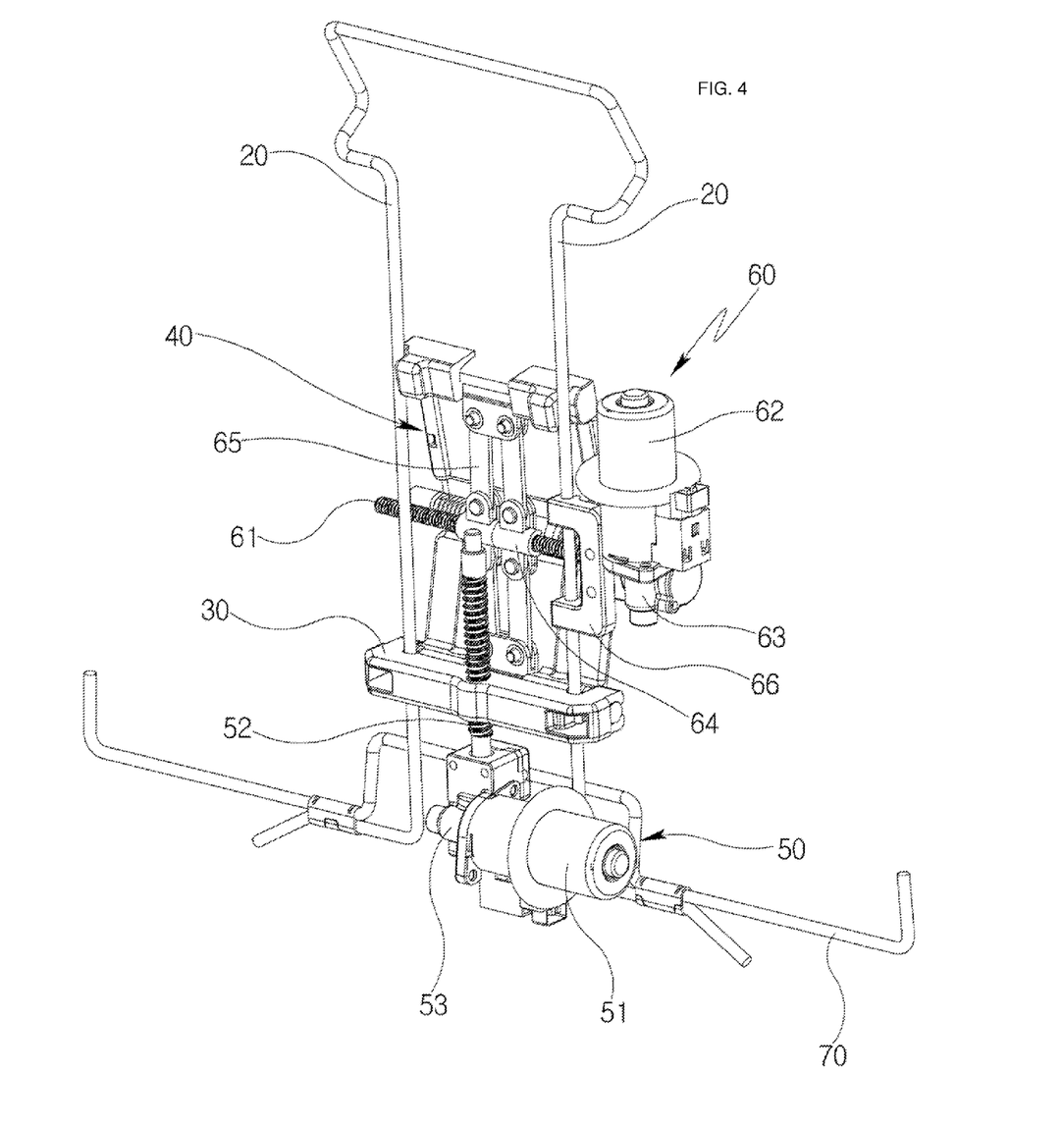
FIG. 4 is a perspective view for explaining structures of first and second driving parts of the 4-way lumbar support illustrated in FIG. 3.

The detailed structure of the 4-way lumbar support 2 is illustrated in FIGS. 3 and 4. Referring to FIGS. 3 and 4, the 4-way lumbar support 2 of the present invention includes a lumbar plate which at least partially forms a curved part to support the back of an occupant, a guide rod 20 which is fixed to the seat back frame 1 and extends vertically, a sliding base 30 which is provided to be vertically movable along the guide rod 20, a pusher 40 which protrudes forward toward the lumbar plate to press the lumbar plate, a first driving part 50 which vertically moves the sliding base 30 to adjust the vertical position of the pusher 40, and a second driving part 60 which adjusts an amount of forward protrusion of the pusher 40.

The lumbar plate may be made of a material having some elasticity and have a plate shape so as to form the curved part suitable for the body type of the occupant. The lumbar plate may be preferably made of a plastic material having some elasticity and stiffness for reducing the weight of a vehicle.

As illustrated in the drawings, the lumbar plate includes a main body part which extends vertically from a seat, and a plurality of blade parts which are arranged at both side surfaces of the main body part.

The main body part may have a plurality of perforation portions which extend vertically.

The lumbar plate has a decreased bending moment by the perforation portions, and thus may reduce the operating load of the second driving part 60. Therefore, the curved part may be easily formed at the lumbar plate.

The lumbar plate of the present invention is fixed to the seat back frame 1 by a lower end support member 70 and a fixing bracket 80, as illustrated in the drawings.

The guide rod 20 guides the vertical movement of the sliding base 30, the second driving part 60, and the pusher 40, and supports them. The guide rod 20 is preferably configured of a pair of left and right rods having a rod shape as illustrated in the drawings.

As illustrated in FIGS. 1 and 2, the upper end portion of the guide rod 20 is securely fixed inside the upper end of the seat back frame 1, and the lower end portion of the guide rod 20 is securely fixed inside the lower end of the seat back frame 1 by the fixing bracket 80 and the lower end support member 70.

The sliding base 30 is provided to be vertically movable along the guide rod 20, and adjusts the vertical position of the second driving part 60. The sliding base 30 includes a main body part 31 having a substantially " ⊏ " shape, a through-hole 32 which is formed in the main body part 31 so that a first lead screw 52 of the first driving part 50 to be described later vertically passes through the through-hole 32, and a guide hole 33 through which the guide rod 20 vertically passes.

The through-hole 32 has a thread which is formed on the inside surface thereof such that the first lead screw 52 of the first driving part 50 is engaged with the thread. Thus, the sliding base 30 is vertically and linearly moved by the rotational force of the first lead screw 52.

In addition, the " ⊏ "-shaped main body part 31 has pivot holes 34 which are formed at both end portions thereof to guide the pivoting of a first hinge member 41 of the pusher 40 to be described later.

The pusher 40 presses the lumbar plate in the forward direction so that the curved part is at least partially formed at the lumbar plate. The pusher 40 is formed such that the amount of forward protrusion thereof is adjusted using a pair of hinge members.

In more detail, the pusher 40 of the 4-way lumbar support 2 of the present invention includes a first hinge member 41, the lower end portion of which is pivotably connected to the sliding base 30, and a second hinge member 42, the lower end portion of which is pivotably connected to the upper end portion of the first hinge member 41 through a hinge shaft 43 while the upper end portion of the second hinge member 42 is slidably supported by the guide rod 20.

That is, the pusher 40 of the 4-way lumbar support 2 of the present invention forms the curved part by pushing the lumbar plate in the forward direction using the first and second hinge members 41 and 42 which are pivotably connected to each other through the hinge shaft 43.

FIG. 3 illustrates a state in which the lower end portion of the first hinge member 41 is maximally spaced apart from the upper end portion of the second hinge member 42, i.e. a state in which the pusher 40 minimally protrudes in the forward direction.

In this case, when the distance between the lower end portion of the first hinge member 41 and the upper end portion of the second hinge member 42 is gradually narrowed by the action of the second driving part 60, the lumbar plate is pushed forward, i.e. toward the occupant by a portion at which the first hinge member 41 is connected to the second hinge member 42 through the hinge shaft 43, and thus the amount of protrusion or curvature of the curved part of the lumbar plate is adjusted.

The detailed structure of the pusher 40 including the first and second hinge members 41 and 42 will be described below with reference to FIG. 5.

The first driving part 50 is supplied with electric power from the outside to vertically move the sliding base 30, and adjusts the vertical position of the pusher 40. The first driving part 50 includes a first motor 51 which is driven by electric power supplied from the outside and is fixed to the seat back frame 1 by the fixing bracket 80 and the lower end support member 70, a first lead screw 52 which extends vertically and is rotatably driven by the first motor 51, and a first deceleration part 53 which is provided between the first motor 51 and the first lead screw 52 to reduce rotation transferred from the first motor 51 to the first lead screw 52.

The first motor 51 may be applied to the present invention without limitation, as long as it has a structure that generates rotational force by electric power supplied from the outside. However, the first motor 51 is preferably an electric motor which may have a small size and generate high power in consideration of space utilization.

The first lead screw 52 is rotated by the rotational force which is generated by the first motor 51 and is transferred through the first deceleration part 53. The lower end portion of the first lead screw 52 is formed with a driven gear (not shown) which is connected to the deceleration part, and the outer peripheral surface of the first lead screw 52 is formed with a screw portion which is engaged with the thread formed on the inner peripheral surface of the through-hole 32 of the sliding base 30.

Through this screwing, the sliding base 30 moves upward or downward along with the rotation of the first lead screw 52, and thus the vertical movement of the sliding base 30 is realized.

The first deceleration part 53 reduces rotational force generated by the first motor 51 and transfers the reduced rotational force to the first lead screw 52. The first deceleration part 53 may be applied to the present invention without limitation, as long as it reduces the rotational force of the first motor 51. However, the first deceleration part 53 preferably includes a worm (not shown) and a worm gear (not shown) such that the position of the sliding base 30 is fixed even when the electric power is not supplied to the first motor 51.

Meanwhile, the second driving part 60 is supplied with electric power from the outside to adjust the amount of forward protrusion of the pusher 40. The second driving part 60 includes a second motor 62 which is driven by electric power supplied from the outside and is provided to be vertically movable along the guide rod 20, a second lead screw 61 which extends in the width direction of the seat and is rotated by rotational force transferred from the second motor 62, at least one nut 64 which has a thread formed on the inner peripheral surface thereof to be engaged with the second lead screw 61 and moves along the outer peripheral surface of the second lead screw 61 along with the rotation of the second lead screw 61, a plurality of link members 65 which connect the nut 64 to each of the first and second hinge members 41 and 42, and a second deceleration part 63 which is provided between the second motor 62 and the first lead screw 52.

The second motor 62 may be applied to the present invention without limitation, as long as it has a structure that generates rotational force by electric power supplied from the outside, similarly to the first motor 51. However, the second motor 62 is preferably an electric motor which may have a small size and generate high power in consideration of space utilization.

The second lead screw 61 is rotated by the rotational force which is generated by the second motor 62 and is transferred through the second deceleration part 63. The second lead screw 61 generally extends in parallel with the hinge shaft 43 of the first and second hinge members 41 and 42. The outer peripheral surface of the second lead screw 61 is formed with a screw portion which is engaged with the thread formed on the inner peripheral surface of the nut 64.

The nut 64 has the thread formed on the inner peripheral surface thereof to be engaged with the second lead screw 61, as described above, and moves along the outer peripheral surface of the second lead screw 61 along with the rotation of the second lead screw 61. Thus, the nut 64 serves to adjust the amount of forward protrusion of the pusher 40 by interaction with the link members 65.

The link members 65 connect the nut 64 to each of the first and second hinge members 41 and 42.

That is, the link members 65 adjust the amount of forward protrusion of the pusher 40 by increasing or decreasing the distance between the lower end portion of the first hinge member 41 and the upper end portion of the second hinge member 42 according to the movement of the nut 64.

The detailed structures of the second lead screw 61, the at least one nut 64, and the plurality of link members 65 will be described below with reference to FIG. 5.

Similarly to the first deceleration part 53, the second deceleration part 63 reduces rotational force generated by the second motor 62 and transfers the reduced rotational force to the second lead screw 61. The second deceleration part 63 may be applied to the present invention without limitation, as long as it reduces the rotational force of the second motor 62. However, the second deceleration part 63 preferably includes a worm (not shown) and a worm gear (not shown) such that the position of the nut 64 is fixed, that is, the pusher 40 is fixed, even when the electric power is not supplied to the second motor 62.

Meanwhile, the hinge shaft 43 of the first and second hinge members 41 and 42 may be vertically and slightly moved by the adjustment of the amount of forward protrusion of the pusher 40 in the fixed state of the sliding base 30. Therefore, when the second driving part 60 is operated, the vertical positions of the second motor 62, and the second lead screw 61, and the second deceleration part 63 may be slightly changed.

Accordingly, the 4-way lumbar support 2 of the present invention may further include a sliding bracket 66 as a means for adjusting the vertical positions of the second motor 62, and the second lead screw 61, and the second deceleration part 63 during the adjustment of the amount of forward protrusion of the pusher 40, i.e. during the operation of the second driving part 60.

As illustrated in FIG. 4, the sliding bracket 66 vertically slides along the guide rod 20. The second motor 62, and the second lead screw 61, and the second deceleration part 63 are connected to the sliding bracket 66 such that the vertical positions thereof may be easily guided by the sliding bracket 66 during the adjustment of the amount of forward protrusion of the pusher 40.

Figure 5:
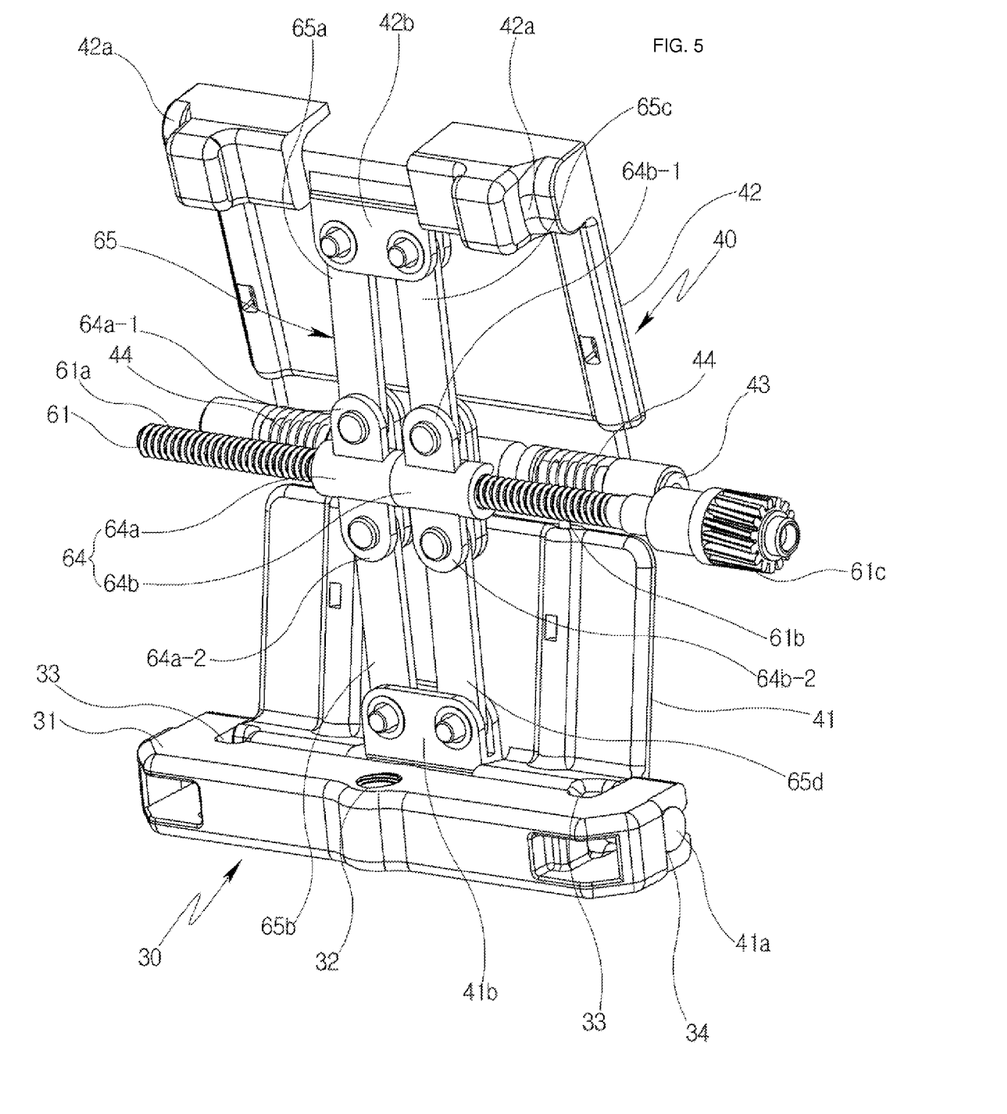
FIG. 5 is a perspective view for explaining structures of a pusher and the second driving part of the 4-way lumbar support according to the embodiment of the present invention.

FIG. 5 is a perspective view for explaining the structures of the pusher 40 and the second driving part 60 of the 4-way lumbar support 2 according to the embodiment of the present invention.

The detailed structures and operations of the pusher 40 and the second driving part 60 will be described below with reference to FIG. 5.

As described above, the pusher 40 of the present invention includes the first and second hinge members 41 and 42 which are pivotably connected to each other through the hinge shaft 43. The amount of protrusion for pushing the lumbar plate in the forward direction is adjusted while a width between the lower end portion of the first hinge member 41 and the upper end portion of the second hinge member 42, i.e. an angle formed by the first and second hinge members 41 and 42 is adjusted.

In order to adjust the angle formed by the first and second hinge members 41 and 42, the 4-way lumbar support 2 of the present invention includes the second lead screw 61 which is rotated by the second motor 62, and the at least one nut 64 which is coupled to the outer peripheral surface of the second lead screw 61 and moves along the outer peripheral surface of the second lead screw 61 along with the rotation of the second lead screw 61. Here, the at least one nut 64 is preferably configured of a first nut 64a and a second nut 64b which move in opposite directions.

In this case, first to fourth link members 65a, 65b, 65c, and 65d are pivotably connected to upper end connection portions 64a-1 and 64b-1 and lower end connection portions 64a-2 and 64b-2 of the respective first and second nuts 64a and 64b.

Accordingly, when the first and second nuts 64a and 64b move in a direction, which is away from or close to each other, along with the rotation of the second lead screw 61, an angle between the first and second hinge members 41 and 42 is decreased or increased by the action of the first to fourth link members 65a, 65b, 65c, and 65d.

In this case, the lower end portion of the first hinge member 41 is connected to the sliding base 30 by a pivot protrusion 41a, and the upper end portion of the second hinge member 42 is connected to the guide rod 20 by a guide groove 42a. Therefore, when the angle is adjusted, the back movement of the lower end portion of the first hinge member 41 and the upper end portion of the second hinge member 42 is limited, and only the hinge shaft 43 moves forward or backward.

Meanwhile, the second hinge member 42 has a first bracket 42b for connecting the first link member 65a to the third link member 65c. The first hinge member 41 has a second bracket 41b for connecting the second link member 65b to the fourth link member 65d.

In addition, the hinge shaft 43 of the first and second hinge members 41 and 42 has a torsion spring for pressing the first and second hinge members 41 and 42 in a direction in which the angel therebetween is increased. When the angle between the first and second hinge members 41 and 42 is adjusted by the torsion spring, a load applied to the second motor 62 may be reduced.

As described above, the first and second nuts 64a and 64b move in the direction, which is away from or close to each other, along with the rotation of the second lead screw 61.

In order for the first and second nuts 64a and 64b to move in opposite directions, the threads on the inner peripheral surfaces of the first and second nuts 64a and 64b, which are coupled to the thread formed on the outer peripheral surface of the second lead screw 61, may be formed in opposite directions.

In this case, the thread formed on the outer peripheral surface of the second lead screw 61 is maintained in a fixed direction.

Alternatively, in the state in which threads on the inner peripheral surfaces of the first and second nuts 64a and 64b are maintained to have the same direction, a thread on the outer peripheral surface of the second lead screw 61, which is coupled with the first nut 64a, and a thread on the outer peripheral surface of the second lead screw 61, which is coupled with the second nut 64b, may be formed in opposite directions.

That is, the outer peripheral surface of the second lead screw 61 is divided into a first section 61a, which is screwed with the first nut 64a, and a second section 61b, which is screwed with the second nut 64b, and the threads formed in the first and second sections 61a and 61b are formed in opposite directions.

Figure 6:
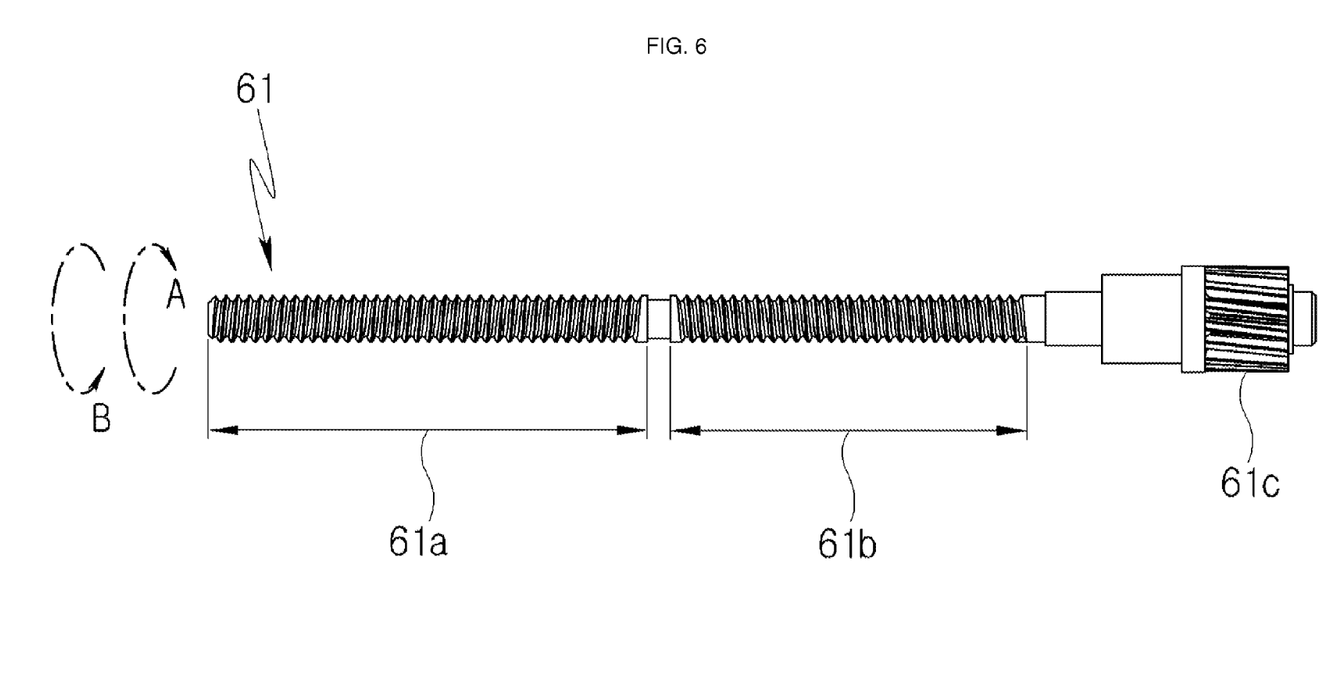
FIG. 6 is a view for explaining a structure of a second lead screw of the 4-way lumbar support according to the embodiment of the present invention.
Figure 7:
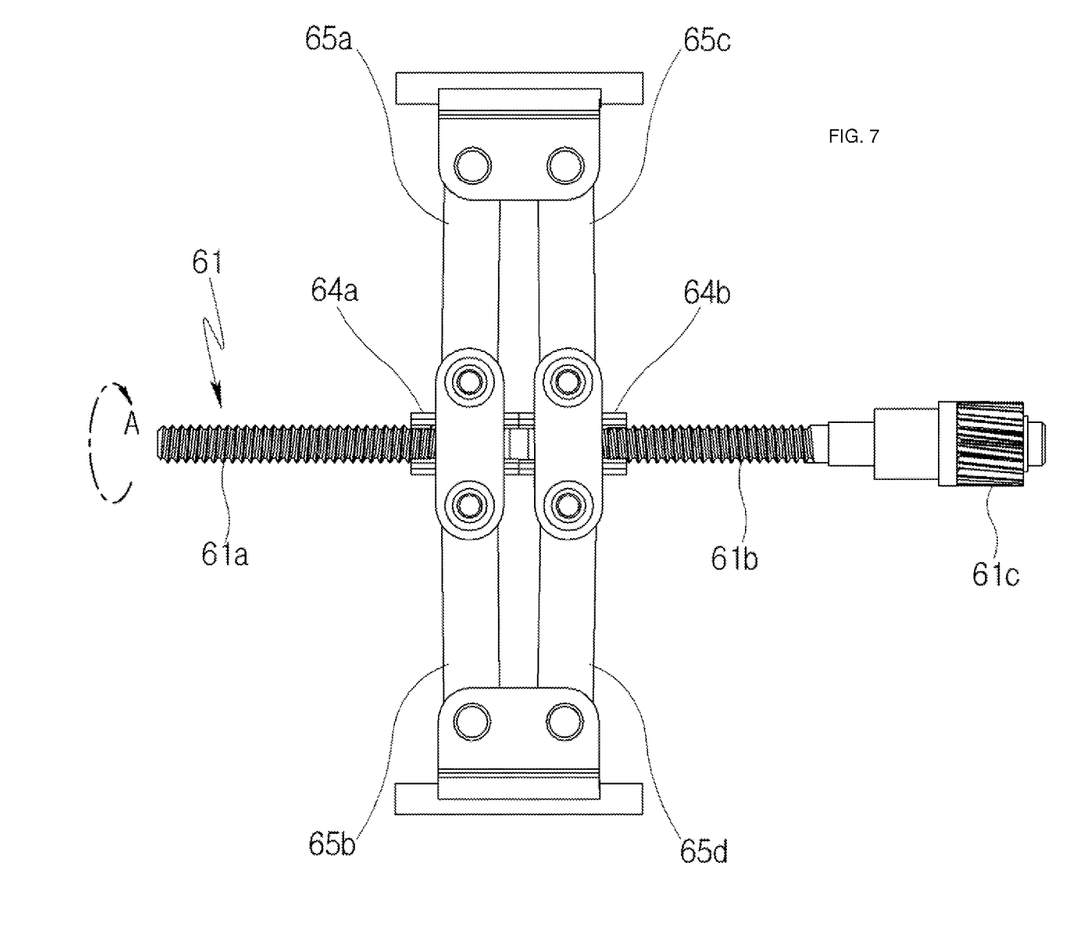
FIGS. 7 and 8 are views for explaining action between the second lead screw illustrated in FIG. 6 and first and second nuts.
Figure 8:
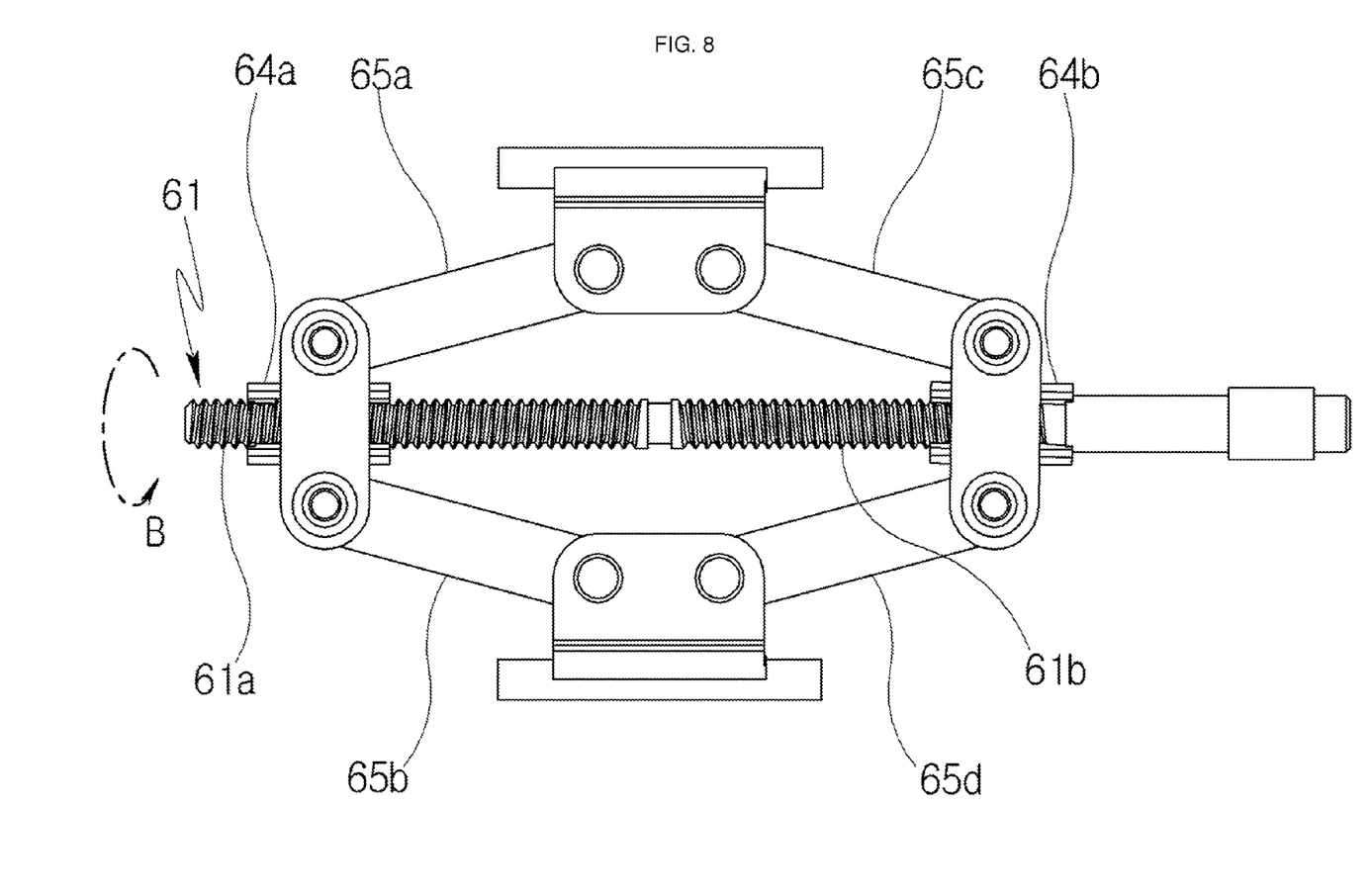

FIGS. 6 to 8 illustrate an example in which the outer peripheral surface of the second lead screw 61 is divided into the first and second sections 61a and 61b.

As illustrated in FIG. 6, the outer peripheral surface of the second lead screw 61 of the present invention may be divided into a first section 61a and a second section 61b which have threads formed in opposite directions. The first and second sections 61a and 61b may preferably have the same width.

In addition, in order for loads applied to the first and second nuts 64a and 64b to be equal to each other, the threads formed in the first and second sections 61a and 61b have the same pitch while only the directions thereof are opposite to each other. Thus, amounts of movement of the first and second nuts 64a and 64b per rotation of the second lead screw 61 are preferably maintained to be equal to each other.

In this state, when the second motor 62 is driven, the second lead screw 61 is connected to the second deceleration part 63 and the second motor 62 by a driven gear 61c formed on one end portion thereof so as to receive rotational force, and rotates in a first direction A or in a second direction B opposite to the first direction A.

FIG. 7 illustrates a state in which the first nut 64a is closest to the second nut 64b.

As illustrated in the drawing, when the second lead screw 61 rotates in the first direction A in the state in which the first nut 64a is closest to the second nut 64b, a force for linearly moving the first and second nuts 64a and 64b in a direction away from each other by screwing therebetween is applied to the first and second nuts 64a and 64b. Thereby, the distance between the first and second nuts 64a and 64b is gradually increased.

When the distance between the first and second nuts 64a and 64b is gradually increased, the angle between the first and second hinge members 41 and 42 is gradually decreased by the action of the first to fourth link members 65a, 65b, 65c, and 65d. In this case, the lumbar plate is pushed forward by the forward protrusion of the hinge shaft 43 of the first and second hinge members 41 and 42, as described above, so that the curved part is formed.

When the distance between the first and second nuts 64a and 64b is continuously increased, the amount of protrusion of the hinge shaft 43 and the amount of curvature of the lumbar plate are gradually increased.

FIG. 8 illustrates a state in which the first nut 64a is maximally spaced apart from the second nut 64b, i.e. a state in which the hinge shaft 43 of the first and second hinge members 41 and 42 maximally protrudes forward.

When the second lead screw 61 rotates in the second direction B in the state in which the first nut 64a is maximally spaced apart from the second nut 64b, a force for linearly moving the first and second nuts 64a and 64b in a direction close to each other by screwing therebetween is applied to the first and second nuts 64a and 64b. Thereby, the distance between the first and second nuts 64a and 64b is gradually decreased.

When the distance between the first and second nuts 64a and 64b is gradually decreased, the angle between the first and second hinge members 41 and 42 is gradually increased by the action of the first to fourth link members 65a, 65b, 65c, and 65d. In this case, the hinge shaft 43 of the first and second hinge members 41 and 42 moves backward, the amount of curvature of the curved part formed at the lumbar plate is gradually decreased.

Figure 9:
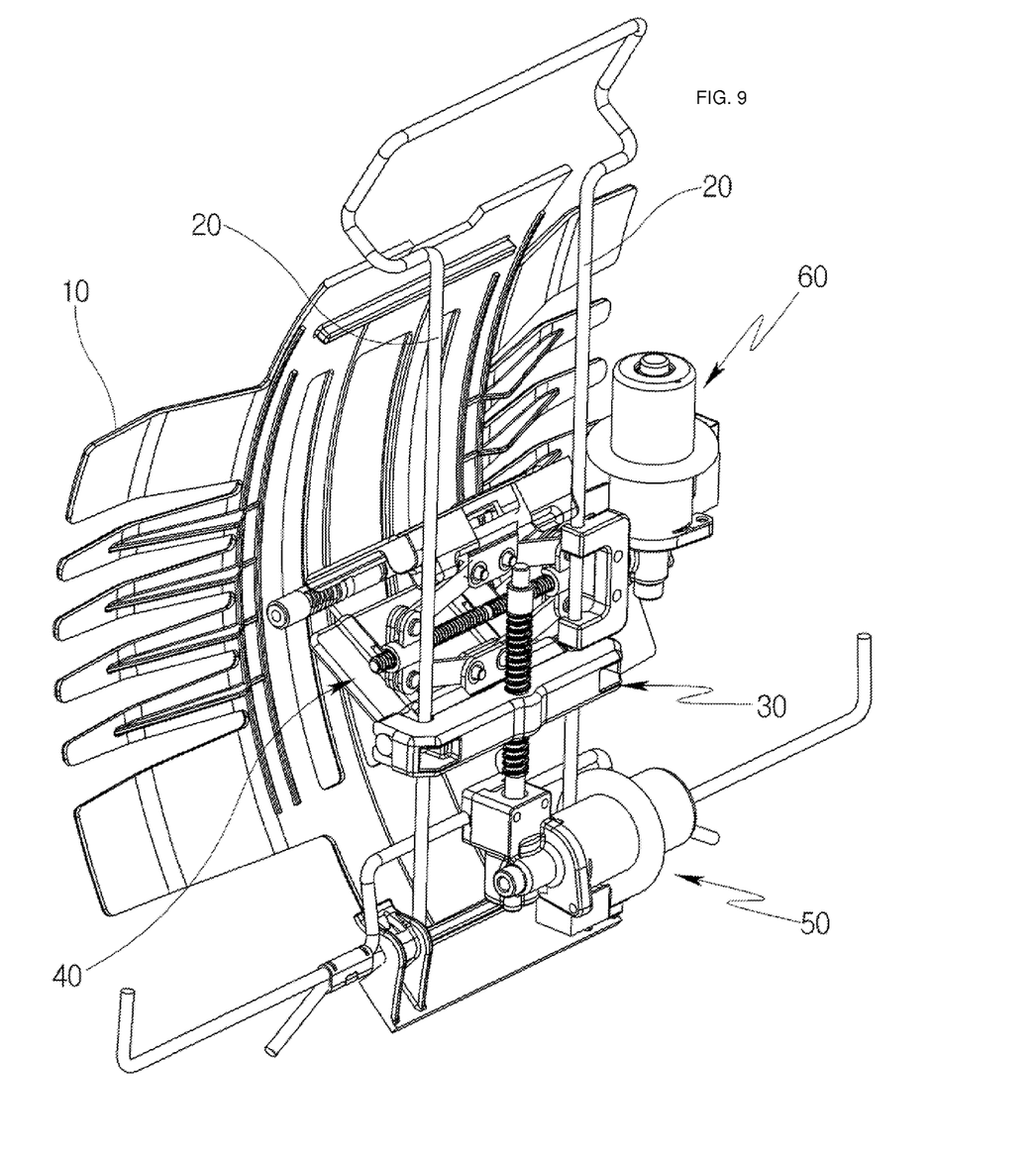
FIG. 9 is a perspective view illustrating a state in which a lumbar plate of the 4-way lumbar support according to the embodiment of the present invention is maximally curved forward.

FIG. 9 illustrates the 4-way lumbar support in the state in which the first nut 64a is maximally spaced apart from the second nut 64b as shown in FIG. 8, i.e. in the state in which the lumbar plate is maximally curved.

In this state, the occupant may automatically adjust the vertical position of the maximum curved part of the lumbar plate, i.e. the vertical position of the pusher 40 by operating the first driving part 50.

In addition, the occupant may automatically adjust the amount of curvature of the lumbar plate, i.e. the amount of forward protrusion of the pusher 40 by operating the second driving part 60.

As is apparent from the above description, a 4-way lumbar support according to the present invention has an effect of automatically adjusting a vertical curved position and an amount of curvature of a lumbar plate while securely supporting the lumbar plate even when a large load, such as the rear-end collision of a vehicle, is applied to the lumbar plate.

In addition, the 4-way lumbar support has an effect of adjusting the amount of forward curvature of the lumbar plate using a pusher including a pair of hinge members, thereby enabling the amount of forward curvature of the lumbar plate to be adjusted across a wider range without increasing the thickness of a seat back in the forward and backward directions thereof.

Various embodiments have been described in the best mode for carrying out the invention. It will be understood that the above-mentioned technical configurations of the exemplary embodiments may be executed in order to enable those of ordinary skill in the art to embody and practice the invention in other specific forms without changing the spirit or essential features of the invention.

Although the present invention has been described with respect to the illustrative embodiments, it will be apparent to those skilled in the art that various variations and modifications may be made without departing from the spirit and scope of the invention as defined in the following claims.

What is claimed is:

1. A 4-way lumbar support comprising:
   a lumbar plate supported by a seat back frame of a vehicle seat and at least partially forming a curved part to support the back of an occupant;
   a guide rod fixed to the seat back frame and extending vertically;
   a sliding base provided to be vertically movable along the guide rod;
   a pusher provided to be vertically movable together with the sliding base and protruding forward toward the lumbar plate to press the lumbar plate;
   a first driving part vertically moving the sliding base by electric power supplied from an outside to adjust a vertical position of the pusher; and
   a second driving part adjusting an amount of forward protrusion of the pusher by the electric power supplied from the outside, wherein:
   the pusher comprises a first hinge member, a lower end portion of which is pivotably connected to the sliding base, and a second hinge member, a lower end portion of which is pivotably connected to an upper end portion of the first hinge member through a hinge shaft while an upper end portion of the second hinge member is slidably supported by the guide rod; and
   a distance between the lower end portion of the first hinge member and the upper end portion of the second hinge member is adjusted by action of the second driving part;
   wherein the second driving part comprises:
   a second motor provided to be vertically movable along the guide rod;
   a second lead screw extending in parallel with the hinge shaft and rotatably driven by the second motor;
   at least one nut having a thread formed on an inner peripheral surface thereof to be engaged with the second lead screw, and moving along an outer peripheral surface of the second lead screw along with rotation of the second lead screw; and
   a plurality of link members connecting the nut to each of the first and second hinge members.

2. The 4-way lumbar support according to claim 1, wherein:
   the first driving part comprises a first motor fixed to the seat back frame, and a first lead screw extending vertically and rotatably driven by the first motor; and
   the sliding base has a through-hole through which the first lead screw passes.

3. The 4-way lumbar support according to claim 2, wherein the through-hole of the sliding base has a thread formed on an inside surface thereof to be engaged with the first lead screw.

4. The 4-way lumbar support according to claim 2, wherein the first driving part further comprises a first deceleration part provided between the first motor and the first lead screw.

5. The 4-way lumbar support according to claim 1, wherein the nut comprises a first nut and a second nut, which move in opposite directions along with the rotation of the second lead screw.

6. The 4-way lumbar support according to claim 5, wherein a thread provided on an inner peripheral surface of the first nut and a thread provided on an inner peripheral surface of the second nut are formed in opposite directions.

7. The 4-way lumbar support according to claim 5, wherein:
   the outer peripheral surface of the second lead screw is divided into a first section screwed with the first nut, and a second section screwed with the second nut; and
   threads formed in the first and second sections are formed in opposite directions.

8. The 4-way lumbar support according to claim 7, wherein the first and second sections have the same width.

9. The 4-way lumbar support according to claim 5, wherein the link members comprise:
   a first link member connected to an upper end of the first nut and the upper end portion of the second hinge member;
   a second link member connected to a lower end of the first nut and the lower end portion of the first hinge member;
   a third link member connected to an upper end of the second nut and the upper end portion of the second hinge member; and
   a fourth link member connected to a lower end of the second nut and the lower end portion of the first hinge member.

10. The 4-way lumbar support according to claim 1, wherein the second driving part further comprises a second deceleration part provided between the second motor and the first lead screw.

11. The 4-way lumbar support according to claim 1, wherein the second driving part further comprises a sliding bracket which is slidably supported by the guide rod while the second motor is fixed to the sliding bracket.

* * * * *